(12) United States Patent
Schliwa-Bertling et al.

(10) Patent No.: US 11,825,332 B2
(45) Date of Patent: Nov. 21, 2023

(54) NETWORK SLICE SERVICE LEVEL AGREEMENT, SLA, FULFILMENT

(71) Applicant: TELEFONAKTIEBOLAGET LM ERICSSON (PUBL), Stockholm (SE)

(72) Inventors: Paul Schliwa-Bertling, Ljungsbro (SE); Ulf Mattsson, Kungsbacka (SE); Maria Pancorbo Marcos, Madrid (ES)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 232 days.

(21) Appl. No.: 17/295,567

(22) PCT Filed: Nov. 20, 2019

(86) PCT No.: PCT/IB2019/059987
§ 371 (c)(1),
(2) Date: May 20, 2021

(87) PCT Pub. No.: WO2020/104969
PCT Pub. Date: May 28, 2020

(65) Prior Publication Data
US 2022/0022090 A1    Jan. 20, 2022

Related U.S. Application Data

(60) Provisional application No. 62/769,586, filed on Nov. 20, 2018.

(51) Int. Cl.
*H04W 28/02* (2009.01)
*H04W 72/543* (2023.01)

(52) U.S. Cl.
CPC ..... *H04W 28/0268* (2013.01); *H04W 72/543* (2023.01)

(58) Field of Classification Search
None
See application file for complete search history.

(56) References Cited

U.S. PATENT DOCUMENTS 10,581,664 B1 * 3/2020 Peng ............... H04W 4/24
2018/0332485 A1 * 11/2018 Senarath ............ H04L 41/044
(Continued)

OTHER PUBLICATIONS

China Mobile, et al., Solution for Key Issue 4 to Assist Slice Resource Allocation and Adjustment, SA WG2 Meeting #128bis, S2-188031, Agenda Item 6.11, Aug. 20-24, 2018, Sophia Antipolis, France, p. 1-5. (Year: 2018).*

(Continued)

*Primary Examiner* — Benjamin Lamont
(74) *Attorney, Agent, or Firm* — Ericsson Inc.

(57) ABSTRACT

A method of operation of an OAM node in a 5G system for fulfilling a service level agreement (SLA) for a network slice. The method comprises the OAM node initializing the slice information at a first network entity (NSSF) including the initial number of users allowed for a slice and transmitting information related to KPI for the slice for QoE monitoring; receiving one or more Quality of Experience (QoE) measurements related to one or more users of the slice, using the received one or more QoE measurements to determine whether the KPI for the slice is reached in accordance with the SLA and in response to determining that the KPI for the slice is not in accordance with the SLA, triggering an action in at least one of corresponding Radio Access Network or a Core Network associated with the slice, such as resource reconfiguration or redistribution across different slices.

10 Claims, 9 Drawing Sheets

(56) References Cited

U.S. PATENT DOCUMENTS

2020/0154292 A1\* 5/2020 Bor-Yaliniz .......... H04W 24/02
2021/0250814 A1\* 8/2021 Poe ........................ H04L 41/12

OTHER PUBLICATIONS

China Mobile, et al., Solution for Key Issue 14: How to ensure that slice SLA is guaranteed, SA WG2 Meeting #29, S2-1810599, Agenda Item 6.11, Oct. 15-19, 2018, Dongguan, China, pp. 1-5 (Year: 2018).\*
China Mobile, et al., Use case NWDA-Assisted slice SLA guarantee and related Key Issue update, SA WG2 Meeting #128bis, S2-188029, Agenda Item 6.11, Aug. 20-24, 2018, Sophia Antipolis, France, pp. 1-2. (Year: 2018).\*
3GPP, "3rd Generation Partnership Project; Technical Specification Group Services and System Aspects; Study of Enablers for Network Automation for 5G (Release 16)", 3GPP Standard; Technical Report; 3GPP TR 23.791, vol. SA WG2, No. V0.5.0, Jul. 19, 2018 (Jul. 19, 2018), pp. 1-48, XP051475034 (Year: 2018).\*
ISR and WO for PCT/IB2019/059987.
Huawei et al., "Solution for Key Issue 4 to help OAM perform Slice Resource Adjustment", GPP Draft; S2-188266, Sophia Antipolis, France; Aug. 16, 2018.
3rd Generation Partnership Project; Technical Specification Group Services and System Aspects; Study of Enablers for Network Automation for 5G (Release 16), 3GPP Standard; Technical Report; 3GPP TR 23.791, 3rd Generation Partnership Project (3GPP), Mobile Competence Centre; 650, Route Des Lucioles; F-06921 Sophia-Antipolis Cedex; France, Nov. 3, 2018.
Nokia et al., Updates to requirements for key issues #12 and #14, 3GPP Draft; S2-1810739, Architectural-Requirements-ENA-23791, 3rd Generation Partnership Project (3GPP), Mobile Competence Centre; 650, Route Des Lucioles; F-06921 Sophia-Antipolis Cedex; France, Oct. 9, 2018.
China Mobile Huawei: "Discussion about how SA5/SA2 work together to guarantee slice SLA", 3GPP Draft; S5-186174 Discussion About How SA5 SA2 Work Together to Guarantee Slice SLA, 3rd Generation Partnership Project (3GPP), Mobile Competence Centre; 650, Route Des Lucioles; F-06921 Sophia, Sep. 28, 2018.
Ericsson: pCR 28.805 Use case and requirement for adjust network slice resources until network slice is stable11, 3GPP Draft; S5-191301 PCR 28.805 Use Case and Requirement for Adjust Network Slice Resources Until Network Slice is Stable Update, 3rd Generation Partnership Project (3GPP), Mobile Competence Centre, Montreal, Canada, Jan. 16, 2019.
China Mobile et al, "Solution for Key Issue 14: How to ensure that slice SLA is guaranteed", 3GPP Draft; S2-1812757 Was 12127 Solution for KI 14 Slice SLA Guarantee—V4.3, 3rd Generation Partnership Project (3GPP), Mobile Competence Centre; 650, Route Des Lucioles; F-06921 Sophia-Antipolis, Nov. 29, 2018.
China Mobile et al: "Solution for Key Issue 14: How to ensure that slice SLA is guaranteed", 3GPP Draft; S2-1813374 Was 3213 Was 12836 Solution for KI 14 Slice SLA Guarantee V4.5, 3rd Generation Partnership Project (3GPP), Mobile Competence Centre; 650, Route Des Lucioles; F-06921 Sophia-AN, vol. SA WG2, No. West Palm Beach, Florida, USA; Oct. 26, 2018-Oct. 30, 2018 Nov. 30, 2018.
China Mobile et al: "Solution for Key Issue 14: How to ensure that slice SLA is guaranteed", 3GPP Draft; S2-1812836 Was 2757 Was 12127 Solution for KI 14 Slice SIA Guarantee—V4.3, 3rd Generation Partnership Project (3GPP), Mobile Competence Centre; 650, Route Des Lucioles; F-06921 Sophia, Nov. 29, 2018.
3GPP TS 23.502. Procedures for the 5G System Aspects; Procedures for the 5G System; Stage 2 (Release 15).

\* cited by examiner

NETWORK SLICE SERVICE LEVEL AGREEMENT, SLA, FULFILMENT

RELATED APPLICATION

This application claims the benefit of provisional patent application Ser. No. U.S. 62/769,586, filed Nov. 20, 2018, the disclosure of which is hereby incorporated herein by reference in its entirety.

TECHNICAL FIELD

The invention relates to network slices in a telecommunication system Architecture.

BACKGROUND

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features, and advantages of the enclosed embodiments will be apparent from the following description.

A discussion paper was submitted to 3GPP on October 2018 to address how different working committees in 3GPP could work together on how to guarantee network slice Service Level Agreement, SLA. It was agreed that coordination may be needed between the management, the 5G Core, 5GC and the next Generation Radio Access Network, NG-RAN (which comprises a 5G Access node, gNodeB and may also comprise a Long Term Evolution Access node, eNodeB). Such coordination or interaction between the different domains (management, Core and Access network) is illustrated in FIG. 4 (Prior art). The management domain provides the SLA assurance from the management perspective. 5GC and NG-RAN contribute to the fulfilment of network slice SLA from the control plane and user plane perspective.

A problem that needs to be addressed is how to ensure that the Slice SLA is guaranteed. Some proposals to 3GPP have been submitted including a proposal that describes that for a newly created Slice, the Operation and Management system, OAM, initially configures X % of the resources of NG-RAN where slice customers UEs are guaranteed access up to 20% of the resources in NG-RAN at peak times. The initial configuration in NG-RAN may later be modified based on the slice SLA fulfillment information from the 5GC (initiated by the NWDAF and sent to NG-RAN by the AMF) as shown in FIG. 5 (Prior art). More particularly, the steps in FIG. 5 (Prior art) are described as follows:

OAM initially configures X % of the resources of NG-RAN for a new slice, during the peak time, NSSF should control subscribers to access the new slice in order to avoid or minimize the negative impact on the other existing slice SLA fulfilment.

1. For the newly created slice, NSSF only allows partial subscribers to access the slice at the start. For example, the slice customer requests Y subscribers (e.g. 10) in particular area for the peak time and NSSF allows partial subscribers (e.g. 1 subscriber) to access the slice at the start.
2. The NSSF sends an Analytics request/subscribe (Event ID=Slice statistics Info, Event Filter information=(S-NSSAIs, Tracking Area, Time Window)) to NWDAF by invoking a Nnwdaf_EventSubscription_Subscribe.
3. The NWDAF provides the data analytics e.g. the estimated Service Experience statistics per application per slice (e.g. average Service MOS) and/or how many percent (e.g. 90%) UEs' service experience satisfy per application ID to the NSSF by means of Nnwdaf_EventSubscription_Notify.
4. With the given number of allowed subscribers, and based on data analytics provided by NWDAF, NSSF determines whether each slice SLA fulfilment (including the new slice and other existing slices) is overfitting or underfitting or fitting:
   4a. NSSF decides that more subscribers can be served and allow more subscribers to access the new slice (e.g. from 1 to 2).
   With the new number of allowed subscribers, NSSF waits for the new data analytics from NWDAF by means of Nnwdaf_EventSubscription_Notify and further determine what to do next i.e. go to step 4*a* or step 4*b*.
   4*b*. NSSF decides to inform NG-RAN of each slice SLA fulfilment (i.e. whether slice X is overfitting or underfitting) if NSSF determines that:
      i. the new slice SLA fulfilment is overfitting and the other existing slices SLA fulfilment is still fitting and the number of allowed subscribers is approximately equal to the number of requested subscribers. In other words, the configured radio resource for the new slice may be more than what is needed.
      ii. or the new slice or any other slice SLA fulfilment is underfitting due to that the new created slice consume the radio resource, then NSSF decreases the allowed subscribers for the new slice. In other words, the radio resource may be less than what is required. NSSF waits for the new data analytics from NWDAF by means of Nnwdaf_EventSubscription_Notify and further determines what to do next i.e. go to step 4*a* or step 4*b* because the NG-RAN could act upon each slice SLA fulfilment to e.g. modify the initially configured X % of the resources of NG-RAN for the new slice.

Note: The new slice have access to the reserved/prioritised Y % resources of NG-RAN for the existing slice Y when the existing slice Y is not using them e.g. during the off-peak time of the existing slice Y and how RAN configure the reserved/prioritised NG-RAN resources is implementation.

4b1. The NSSF provides the each slice SLA fulfilment information per Tracking Area, TA, to AMF by invoking a Nnssf_NSSAIAvailability_Notify service operation which is defined in clause 5.2.16.3.3, 3GPP TS 23.502.
   4b2. The AMF send an AMF CONFIGURATION UPDATE (the per slice SLA fulfilment information TAI) message which is defined in clause 8.7.3.2 of 3GPP TS 38.413 to RAN. In other words, the AMF sends the AMF CONFIGURATION UPDATE message to every RAN belonging to the TA.
   4b3. RAN may take into account the per slice SLA fulfilment information to schedule radio resource for the slice. NSSF informs NG-RAN (via AMF) of each slice SLA fulfilment (i.e. whether slice X is overfitting or underfitting), which will be taken into account by RAN to schedule radio resource for slices (e.g. by modifying the initially configured X % or updated X % of the resources of NG-RAN for the new slice).

4b4. RAN acknowledges the AMF CONFIGURATION UPDATE message. After step 4b4, the step 3 is performed, then NSSF will re-determine whether each slice SLA fulfilment (including the new slice and other existing slices) is overfitting or underfitting or fitting.

5. Based on each slice SLA fulfilment information, operator make the final decision that the new slice SLA is met either totally or partially and negotiates the SLA with the slice customer accordingly.

For example, due to lack of NG-RAN radio resource, NSSF finds out only 80% SLA fulfilment of the new slice can be met. The slice customer requires average Service MOS for the Application=4 and 95% UE's experience for the Application satisfy. However the estimated per slice statistics by NWDAF indicates that only average Service MOS for the Application=3.2 and 76% UE's experience for the Application satisfy.

SUMMARY

As stated above, a problem that needs to be addressed is how to ensure that the Slice SLA is guaranteed. The embodiments presented herein are however based on a solution that uses Operation and Management system (OAM) because unlike the above solution OAM has a cross domain knowledge of resource situation.

The overall responsibility for SLAs and their fulfilment is located in the Business Support System, BSS layer. The SLA is then broken down into policies in different layers. These delegated policies are kept by monitoring Key Performance indicators, KPIs, at different layers. Slice KPIs are monitored by OAM and Slice management is performed by OAM or management entity in the BSS layer.

A slice can cover both RAN and CN domain. Then each domain may have its separate KPIs. Fulfilment of slice KPIs are then done per domain. RAN domain for instance provides information to OAM that is managing the RAN. Similarly, CN domain for instance provides information to OAM that is managing the RAN.

If information, such as Quality of Experience (QoE) per user or group of users is needed, NWDAF role might optionally be to contribute with this info in a near real time fashion. Information from different domains might be needed to assure enough information is available for NWDAF to calculate QoE. The exact details on how to measure the QoE are not provided in this specification. However, 3GPP is currently describing some of those details in 3GPP TS 28.404, 405 and 406.

The QoE per user or group of users can instead or in addition be collected from an application at the UE and/or at server side (e.g., Application Function/server).

In one aspect, if QoE per user or group of users is required, NWDAF sends this info to the management node (herein referred to as OAM) which takes the received QoE into account to determine if the KPIs are reached in accordance with the SLA and hence fulfilling the SLA. When the OAM determines that the KPI is not according to the SLA, the OAM would trigger any action in the RAN and/or CN domain to mitigate a possible non-fulfilment of the KPI, such as resource reconfiguration (increase or decrease of resource allocation to the slice) or redistribution, such a redistribution of network resources from one slice to another slice without compromising the fulfillment of any of the slices SLAs.

In accordance with an aspect, a method of providing network slice service level agreement guarantee is provided, the method is performed by a management node (e.g., OAM) and comprises initializing the slice information at a first network entity such as an NSSF where the slice information includes initial number of users allowed for a slice, transmitting to a second network entity (such as NWDAF and may be another entity) information related to Key Performance Indicators (KPI) for the slice for QoE monitoring; receiving one or more Quality of Experience (QoE) measurements related to one or more users of the slice; and using the received one or more QoE measurements to determine whether the KPI for the slice is reached in accordance with the slice SLA; and in response to determining that the KPI for the slice is not in accordance with the SLA, triggering an action in at least one of corresponding Radio Access Network or a Core Network associated with the slice. The action may be reconfiguring the resources allocated to the slice in at least one of the radio access network or in the core network. Reconfiguration may imply increasing the number of resources allocated to the slice in the Radio Access Network or in the Core Network or decreasing the number of resources allocated to the slice or another slice in the Radio Access Network or in the Core Network and in effect causing a redistribution of resources across different slices without compromising the slices SLAs.

In another aspect, in response to determining that the KPI for the slice is in accordance with the service level agreement, the management node monitors the performance of the slice and/or determines that the slice is stable and initiates control of the number of users accessing the slice by indicating to the first entity (e.g., NSSF) that users are not allowed to the slice, or that perhaps users from certain tracking areas should not be allowed the slice.

In one aspect, the management node further executes the step of subscribing to notification for QoE measurements of the one or more users of the slice. That subscription is performed at the second entity which may be the NWDAF.

In accordance with another aspect, a a management node is adapted to perform any of the embodiments described herein.

In accordance with another aspect, a management node comprises one or more processors; and memory comprising instructions executable by the one or more processors whereby the management node is adapted to perform any of the embodiments described herein.

This summary is not an extensive overview of all contemplated embodiments and is not intended to identify key or critical aspects or features of any or all embodiments or to delineate the scope of any or all embodiments. In that sense, other aspects and features will become apparent to those ordinarily skilled in the art upon review of the following description of specific embodiments in conjunction with the accompanying figures.

BRIEF DESCRIPTION OF THE DRAWINGS

The accompanying drawing figures incorporated in and forming a part of this specification illustrate several aspects of the disclosure, and together with the description serves to explain the principles of the disclosure.

DESCRIPTION

Figure 1:
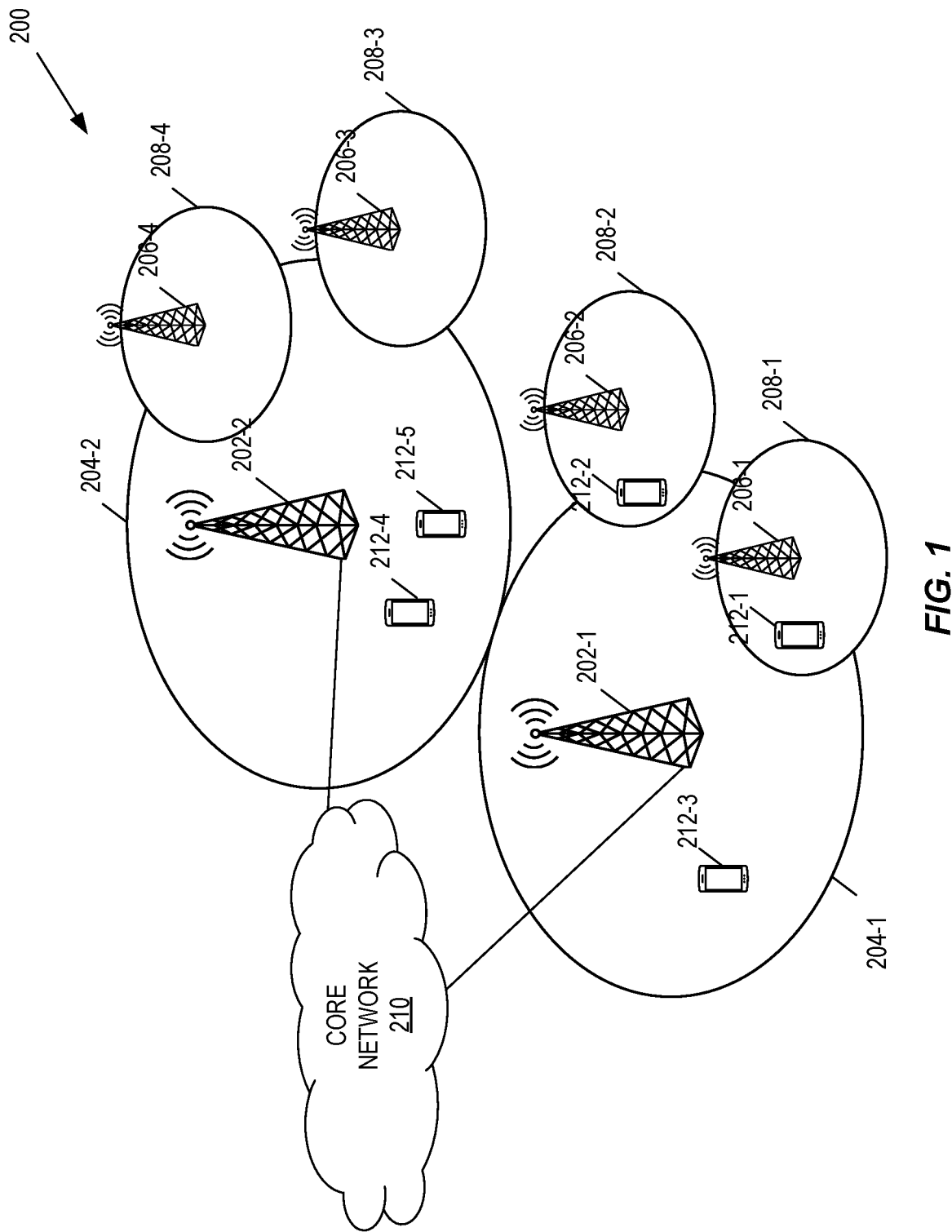
FIG. 1 illustrates an example of a telecommunication system.

In the following description, numerous specific details are set forth. However, it is understood that embodiments may be practiced without these specific details. In other instances, well-known circuits, structures, and techniques have not been shown in detail in order not to obscure the understanding of the description. Those of ordinary skill in the art, with the included description, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether or not explicitly described.

As used herein, the singular forms "a", "an" and "the" are intended to include the plural forms as well, unless the context clearly indicates otherwise. It will be further understood that the terms "comprises," "comprising," "includes," and/or "including" when used herein, specify the presence of stated features, integers, steps, operations, elements, and/or components, but do not preclude the presence or addition of one or more other features, integers, steps, operations, elements, components, and/or groups thereof.

In the present disclosure, a wireless device is a non-limiting term and refers to a device capable, configured, arranged and/or operable to communicate wirelessly with network nodes and/or another wireless device. Communicating wirelessly may involve transmitting and/or receiving wireless signals using electromagnetic signals, radio waves, infrared signals, and/or other types of signals suitable for conveying information through air. In particular embodiments, wireless devices may be configured to transmit and/or receive information without direct human interaction. For instance, a wireless device may be designed to transmit information to a network on a predetermined schedule, when triggered by an internal or external event, or in response to requests from the network. Generally, a wireless device may represent any device capable of, configured for, arranged for, and/or operable for wireless communication, for example radio communication devices. Examples of wireless devices include, but are not limited to, user equipment (UE) such as smart phones. Further examples include wireless cameras, wireless-enabled tablet computers, laptop-embedded equipment (LEE), laptop-mounted equipment (LME), USB dongles, and/or wireless customer-premises equipment (CPE).

As one specific example, a wireless device may represent a UE configured for communication in accordance with one or more communication standards promulgated by the 3rd Generation Partnership Project (3GPP), such as 3GPP's LTE, and/or 5G standards. As used herein, a "user equipment" or "UE" may not necessarily have a "user" in the sense of a human user who owns and/or operates the relevant device. Instead, a UE may represent a device that is intended for sale to, or operation by, a human user but that may not initially be associated with a specific human user.

The wireless device may support device-to-device (D2D) communication, for example by implementing a 3GPP standard for sidelink communication and may in this case be referred to as a D2D communication device.

As yet another specific example, in an Internet of Things (IOT) scenario, a wireless device may represent a machine or other device that performs monitoring and/or measurements and transmits the results of such monitoring and/or measurements to another wireless device and/or a network node. The wireless device may in this case be a machine-to-machine (M2M) device, which may in a 3GPP context be referred to as a machine-type communication (MTC) device. As one particular example, the wireless device may be a UE implementing the 3GPP narrow band internet of things (NB-IoT) standard. Particular examples of such machines or devices are sensors, metering devices such as power meters, industrial machinery, or home or personal appliances, e.g. refrigerators, televisions, personal wearables such as watches etc. In other scenarios. A wireless device such as a UE may be used as router or a relay for these internet of things devices that connect to the network via the UE. A wireless device may also represent a vehicle or other equipment that is capable of monitoring and/or reporting on its operational status or other functions associated with its operation.

A wireless device as described above may represent the endpoint of a wireless connection, in which case the device may be referred to as a wireless terminal. Furthermore, a wireless device as described above may be mobile, in which case it may also be referred to as a mobile device or a mobile terminal. The term User Equipment, UE, is used henceforth to describe the embodiments, however wireless device and user equipment may sometimes be used interchangeably.

As used herein, "network node" refers to equipment capable, configured, arranged and/or operable to communicate directly or indirectly with a wireless device and/or with other equipment in the wireless communication network, such as 5GC that enable and/or provide to the wireless device access to one or more data networks. Examples of network nodes used in the embodiments herein include but are not limited to 5GC entities (physical node, data center, etc.) implementing session management function, SMF, policy control function, PCF, user plane function (UPF), NWDAF, an AF and Access and Mobility management function (AMF).

More generally, network nodes may represent any suitable device (or group of devices) capable, configured, arranged, and/or operable to enable and/or provide a wireless device access to the data network (DN) over the wireless communication network (5GC) or similar and to provide some service to a wireless device that has accessed the wireless communication network. A DN may be an IMS, in which case the AF is a P-CSCF, or if the DN is Time sensitive network (TSN), the AF is a TSN AF.

Radio Node: As used herein, a "radio node" is either a radio access node or a wireless device.

Radio Access Node: As used herein, a "radio access node" or "radio network node" is any node in a radio access network of a cellular communications network that operates to wirelessly transmit and/or receive signals. Some examples of a radio access node include, but are not limited to, a base station (e.g., a New Radio (NR) base station (gNB) in a 3GPP 5G NR network or an enhanced or evolved Node B (eNB) in a 3GPP Long Term Evolution (LTE) network), a high-power or macro base station, a low-power base station (e.g., a micro base station, a pico base station, a home eNB, or the like), and a relay node.

Core Network Node: As used herein, a "core network node" is any type of node in a core network or any node that implements a core network function. Some examples of a core network node include, e.g., a Mobility Management Entity (MME), a Packet Data Network Gateway (PGW), a Service Capability Exposure Function (SCEF), a Home Subscriber Server (HSS), or the like. Some other examples of a core network node include a node implementing a Access and Mobility Function (AMF), a UPF, a Session Management Function (SMF), an Authentication Server Function (AUSF), a Network Slice Selection Function (NSSF), a Network Exposure Function (NEF), a Network Repository Function (NRF), a Policy Control Function (PCF), a Unified Data Management (UDM), Network Data Analytics, NWDAF, or the like.

Wireless Device: As used herein, a "wireless device" is any type of device that has access to (i.e., is served by) a cellular communications network by wirelessly transmitting and/or receiving signals to a radio access node(s). Some examples of a wireless device include, but are not limited to, a UE in a 3GPP network and a Machine Type Communication (MTC) device.

Network Node: As used herein, a "network node" is any node that is either part of the radio access network or the core network of a cellular communications network/system.

Network function: a function in software that can be implemented either as a network element on a dedicated hardware, such as a network node, as a software instance running on a dedicated hardware, or as a virtualised function instantiated on an appropriate platform, e.g. on a cloud infrastructure Network entity: may be a network function or a network node/dedicated hardware or platform implementing one or more network function.

In context of 5GC and the present disclosure some definitions are useful, but similar aspects can be provided by other wireless communication systems.

QoS Flow: The QoS Flow is the finest granularity of QoS differentiation in the PDU Session. A QoS Flow ID (QFI) is used to identify a QoS Flow in the 5G System. User Plane traffic with the same QFI within a PDU Session receives the same traffic forwarding treatment (e.g. scheduling, admission threshold). The QFI is carried in an encapsulation header on N3 (and N9) i.e. without any changes to the e2e packet header. QFI shall be used for all PDU Session Types. The QFI shall be unique within a PDU Session. The QFI may be dynamically assigned or may be equal to the 5QI. QoS Flow is controlled by an SMF.

QoS Rules: A QoS rule contains the QFI of the associated QoS Flow, a Packet Filter Set identifying the data flows and a precedence value. An explicitly signalled QoS rule contains a QoS rule identifier which is unique within the PDU Session and is generated by SMF.

Default QoS rule: is required to be sent to the UE for every PDU Session establishment and it is associated with a QoS Flow. For IP type PDU Session or Ethernet type PDU Session, the default QoS rule is the only QoS rule of a PDU Session whose Packet Filter Set may contain a packet filter that allows all UL packets, and in this case, the highest precedence value shall be used for the QoS rule. The filter in the Packet Filter Set of the default QoS rule that allows all UL traffic (also known as match-all filter) is described in 3GPP TS 24.501.

QoS Profile: A QoS Flow may either be 'GBR' or 'Non-GBR' depending on its QoS profile. The QoS profile of a QoS Flow is sent to the (R)AN and it contains the following QoS parameters:

For each QoS Flow, the QoS profile shall include the 5QI and the ARP:

For each Non-GBR QoS Flow only, the QoS profile may also include the Reflective QoS Attribute (RQA).

For each GBR QoS Flow only, the QoS profile shall also include Guaranteed Flow Bit Rate (GFBR), UL and DL, Maximum Flow Bit Rate (MFBR)—UL and DL, and in the case of a GBR QoS Flow only, the QoS profile may also include one or more of the QoS parameters such as Notification control and Maximum Packet Loss Rate—UL and DL.

Note that the description given herein focuses on a 3GPP cellular communications system, such as 5G System, 5GS, and as such, 3GPP terminology or terminology similar to 3GPP terminology is oftentimes used. However, the concepts disclosed herein are not limited to a 3GPP system.

While the embodiments described herein focus on a 5G system, the present disclosure is not limited to the use of a 5G system. Any suitable cellular or mobile communications system that use network slicing can take advantage of the embodiments described herein with little or no adaptation.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Embodiments of the present disclosure provide a solution for slice Service Level Agreement (SLA) guarantee that relies on the OAM system to obtain the QoE information from the NWDAF, and to use the received QoE information and other obtained information for reaching the slice KPIs as required by the SLA to optimize the resources in the RAN (i.e., NG-RAN in 5GS) and perhaps in the 5G Core (5GC).

Before describing embodiments of the present disclosure in more detail, a brief discussion of a 5G system is beneficial. In this regard, FIG. 2 (Prior Art) illustrates one example of a cellular communications network 200 according to some embodiments of the present disclosure. In the embodiments described herein, the cellular communications network 200 is a 5G NR network. In this example, the cellular communications network 200 includes base stations 202-1 and 202-2, which in 5G NR are referred to as gNBs, controlling corresponding macro cells 204-1 and 204-2. The base stations 202-1 and 202-2 are generally referred to herein collectively as base stations 202 and individually as base station 202. Likewise, the macro cells 204-1 and 204-2 are generally referred to herein collectively as macro cells 204 and individually as macro cell 204. The cellular communications network 200 may also include a number of low power nodes 206-1 through 206-4 controlling corresponding small cells 208-1 through 208-4. The low power nodes 206-1 through 206-4 can be small base stations (such as pico or femto base stations) or Remote Radio Heads (RRHs), or the like. Notably, while not illustrated, one or more of the small cells 208-1 through 208-4 may alternatively be provided by the base stations 202. The low power nodes 206-1 through 206-4 are generally referred to herein collectively as low power nodes 206 and individually as low power node 206. Likewise, the small cells 208-1 through 208-4 are generally referred to herein collectively as small cells 208 and individually as small cell 208. The base stations 202 (and optionally the low power nodes 206) are connected to a core network 210.

The base stations 202 and the low power nodes 206 provide service to wireless devices 212-1 through 212-5 in the corresponding cells 204 and 208. The wireless devices 212-1 through 212-5 are generally referred to herein collectively as wireless devices 212 and individually as wireless device 212. The wireless devices 212 are also sometimes referred to herein as UEs.

Figure 2:
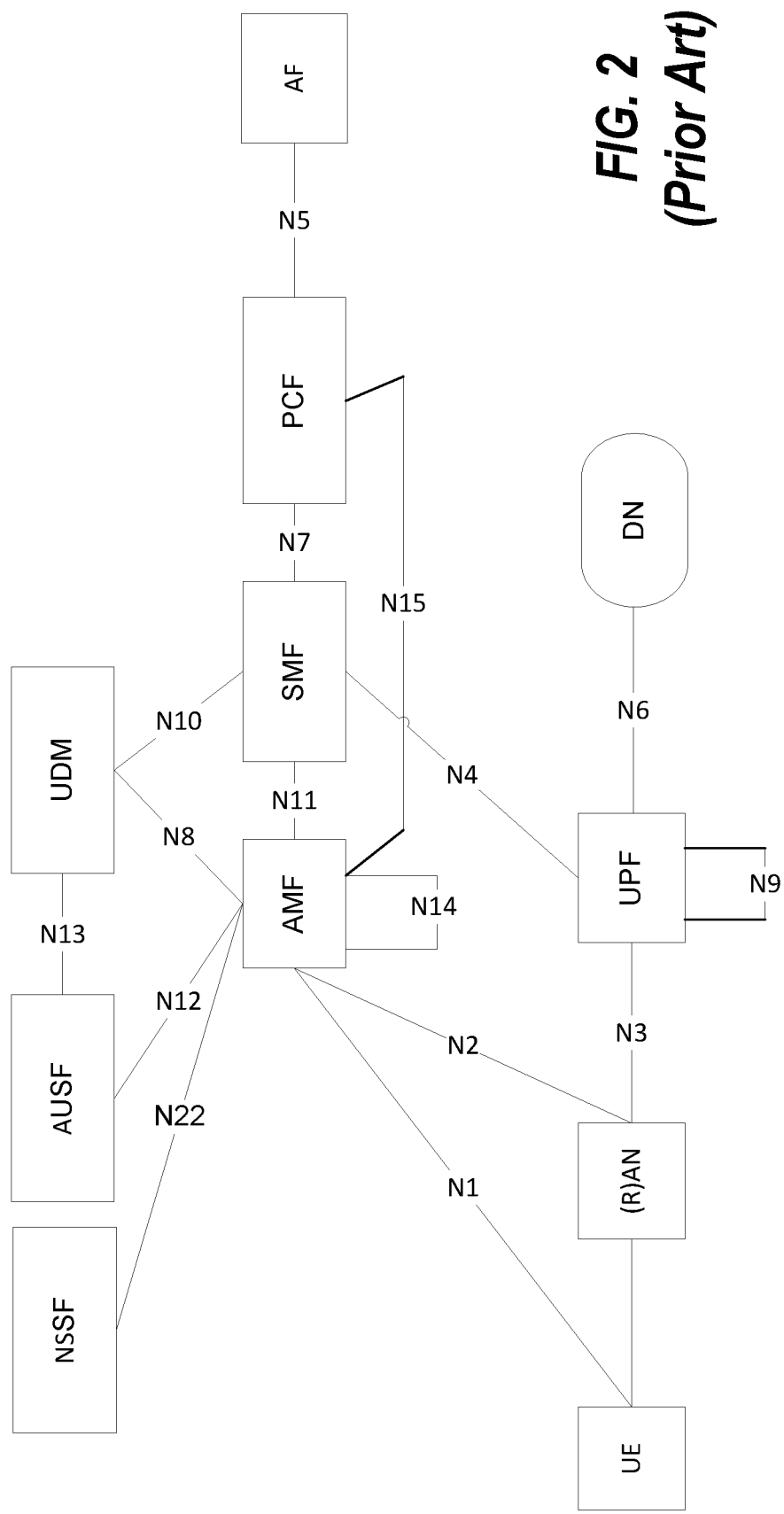
FIG. 2 (prior art) illustrates a 5GC SBA architecture, with reference point view, as specified in 3GPP TS 23.501.

FIG. 2 (Prior Art) illustrates a wireless communication system represented as a 5G network architecture composed of core Network Functions (NFs), where interaction between any two NFs is represented by a point-to-point reference point/interface. FIG. 2 (Prior Art) can be viewed as one particular implementation of the system 200 of FIG. 2.

Seen from the access side the 5G network architecture shown in FIG. 2 (Prior Art) comprises a plurality of UEs connected to either a Radio Access Network (RAN) or an Access Network (AN) as well as an AMF. Typically, the R(AN) comprises base stations, e.g. such as eNBs or gNBs or similar. Seen from the core network side, the 5G core NFs shown in FIG. 2 (Prior Art) include a Network Slice Selection Function (NSSF), an AUSF, a UDM, an AMF, a SMF, a PCF, and an Application Function (AF).

Reference point representations of the 5G network architecture are used to develop detailed call flows in the normative standardization. The N1 reference point is defined to carry signaling between the UE and AMF. The reference points for connecting between the AN and AMF and between the AN and UPF are defined as N2 and N3, respectively. There is a reference point, N11, between the AMF and SMF, which implies that the SMF is at least partly controlled by the AMF. N4 is used by the SMF and UPF so that the UPF can be set using the control signal generated by the SMF, and the UPF can report its state to the SMF. N9 is the reference point for the connection between different UPFs, and N14 is the reference point connecting between different AMFs, respectively. N15 and N7 are defined since the PCF applies policy to the AMF and SMP, respectively. N12 is required for the AMF to perform authentication of the UE. N8 and N10 are defined because the subscription data of the UE is required for the AMF and SMF.

The 5G core network aims at separating user plane and control plane. The user plane carries user traffic while the control plane carries signaling in the network. In FIG. 2 (Prior Art), the UPF is in the user plane and all other NFs, i.e., the AMF, SMF, PCF, AF, AUSF, and UDM, are in the control plane. Separating the user and control planes guarantees each plane resource to be scaled independently. It also allows UPFs to be deployed separately from control plane functions in a distributed fashion. In this architecture, UPFs may be deployed very close to UEs to shorten the Round Trip Time (RTT) between UEs and data network for some applications requiring low latency.

In the context of this specification, two function of the 5GC are relied upon and those include the Network Slice Selection Function (NSSF) and the Network Data Analytics Function (NWDAF) specified in 3GPP TS 23.501. The NSSF supports selecting the set of Network Slice instances serving the UE; determining the Allowed NSSAI and, if needed, the mapping to the Subscribed S-NSSAIs; determining the Configured NSSAI and, if needed, the mapping to the Subscribed S-NSSAIs; and determining the AMF Set to be used to serve the UE.

The NWDAF represents operator managed network analytics logical function. The NWDAF supports data collection from NFs and AFs; supports data collection from OAM; NWDAF service registration and metadata exposure to NFs/AFs; and supports analytics information provisioning to NFs, AF.

The 5GC architecture is composed of modularized functions. For example, the AMF and SMF are independent functions in the control plane. Separated AMF and SMF allow independent evolution and scaling. Other control plane functions like the PCF and AUSF can be separated as shown in FIG. 2 (Prior Art). Modularized function design enables the 5G core network to support various services flexibly.

Each NF interacts with another NF directly. It is possible to use intermediate functions to route messages from one NF to another NF. In the control plane, a set of interactions between two NFs is defined as service so that its reuse is possible. This service enables support for modularity. The user plane supports interactions such as forwarding operations between different UPFs.

Figure 3:
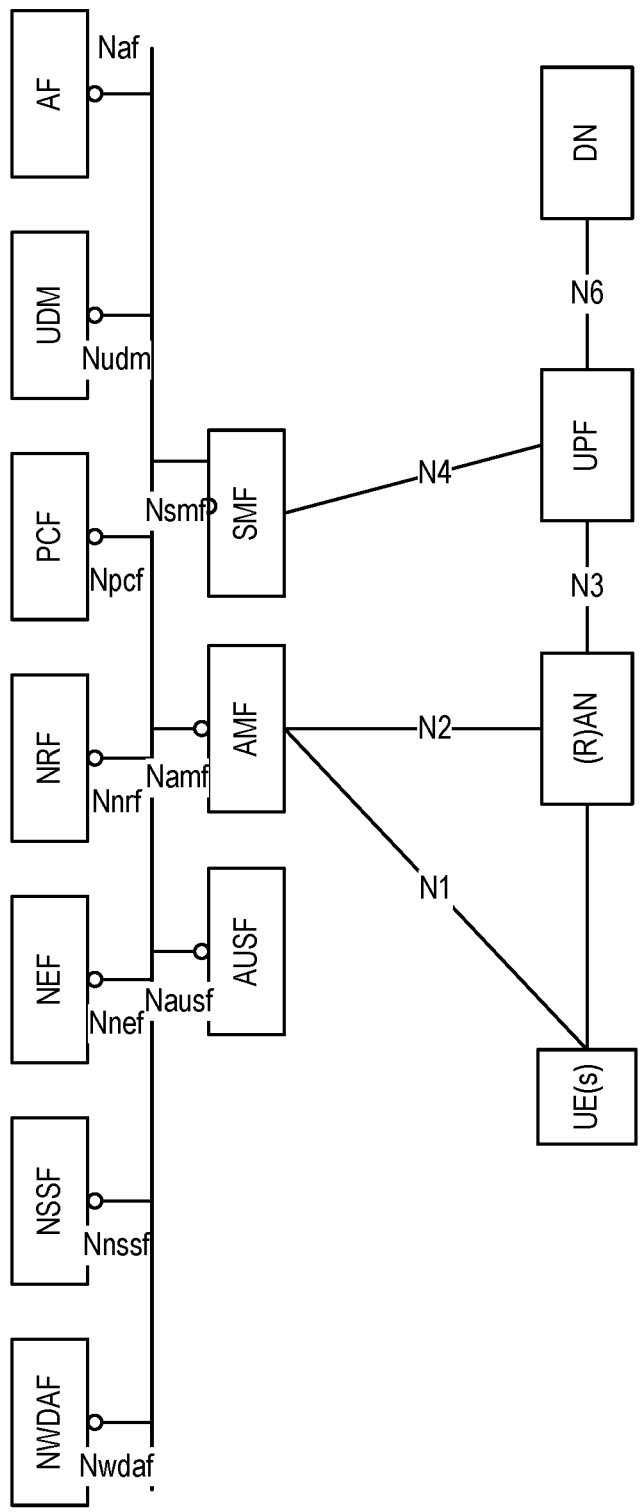
FIG. 3 (Prior art) illustrates a 5GC SBA architecture, service-based interface view, as specified in 3GPP TS 23.501.
Figure 4:
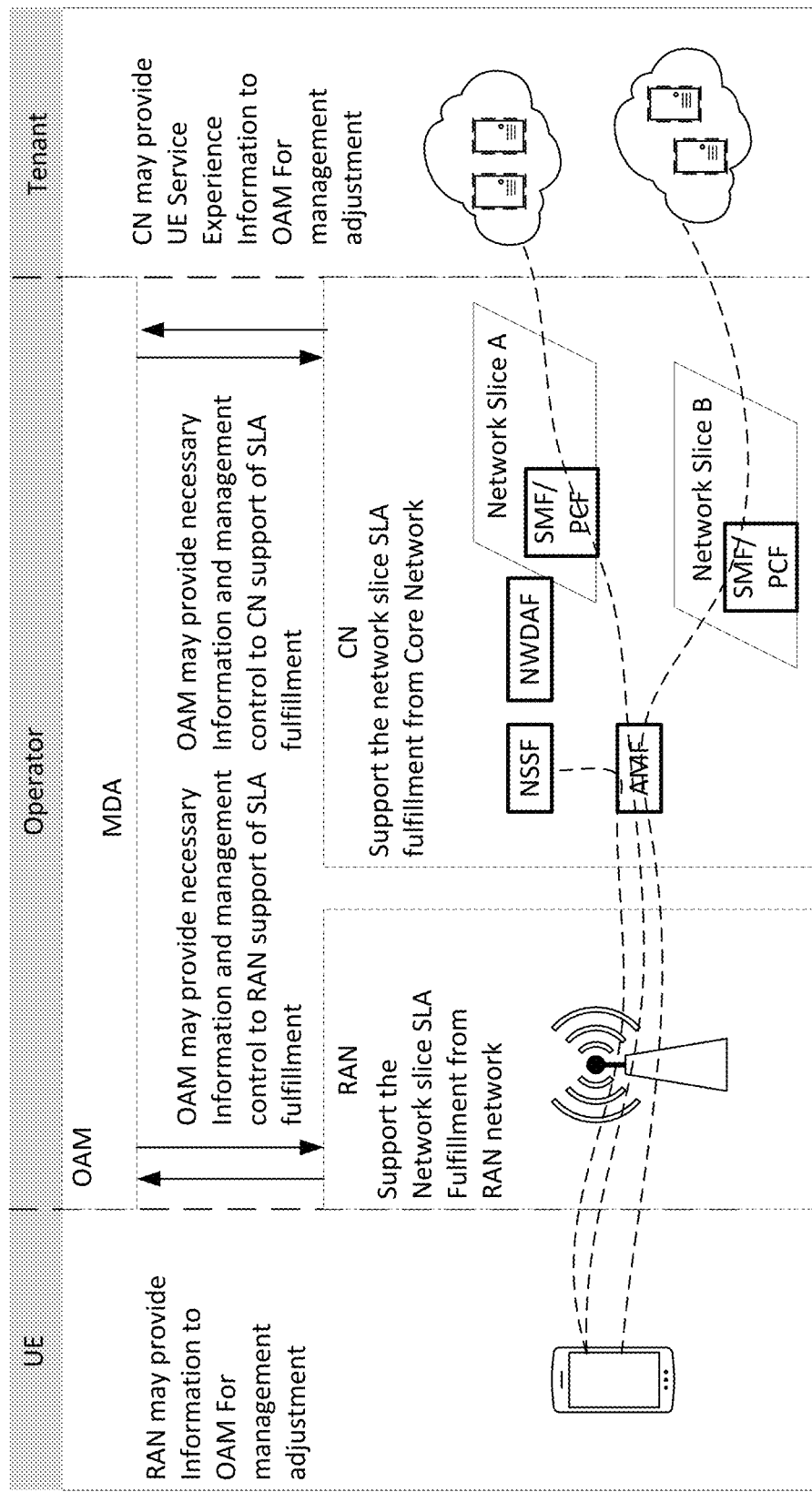
FIG. 4 (Prior art) illustrates a coordination or interaction between management and Core Network and RAN domains.
Figure 5:
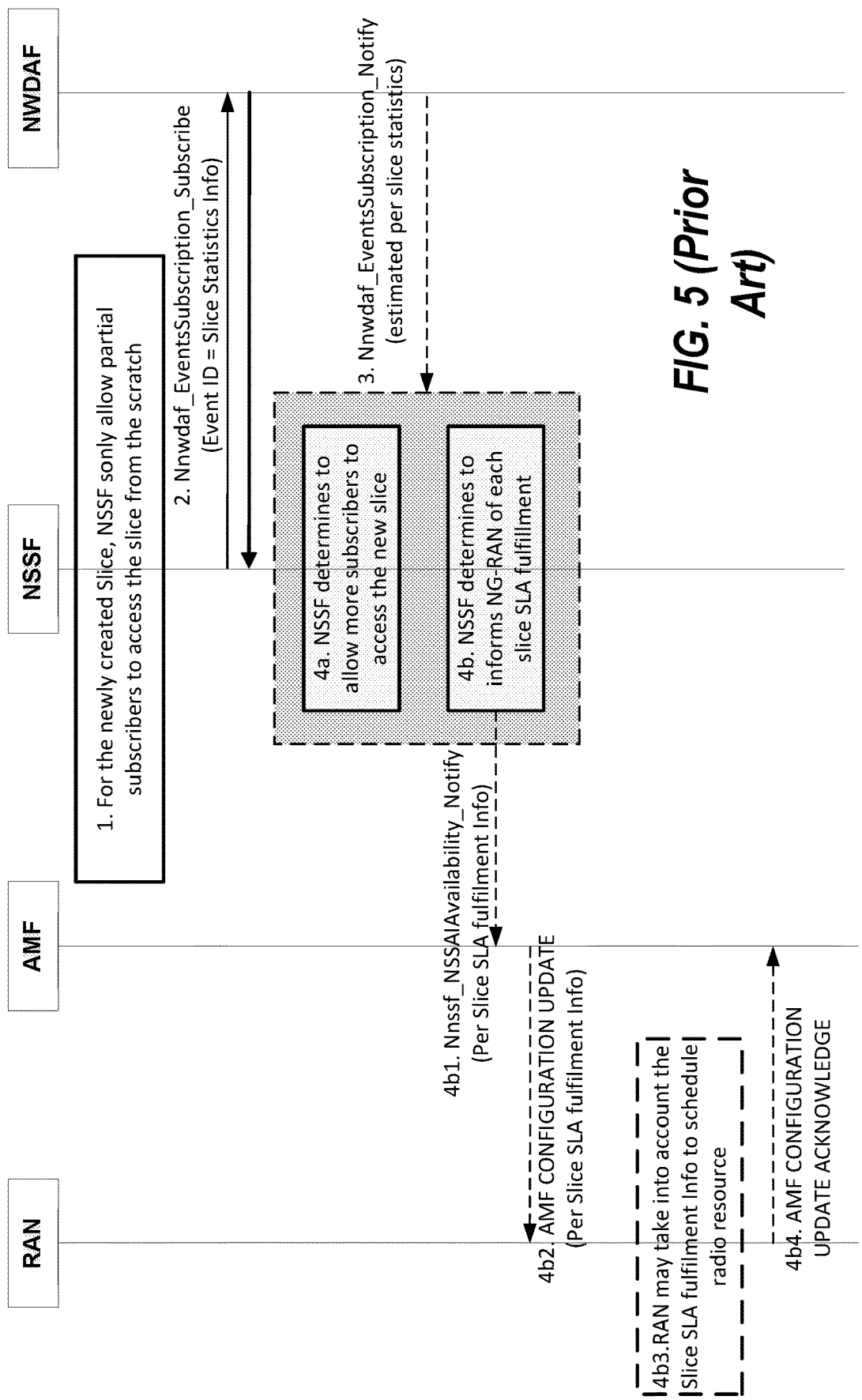
FIG. 5 (Prior Art) illustrates a call flow for SLA guarantee as per the current art.

FIG. 3 (Prior Art) illustrates a 5G network architecture using service-based interfaces between the NFs in the control plane, instead of the point-to-point reference points/interfaces used in the 5G network architecture of FIG. 2 (Prior Art). However, the NFs described above with reference to FIG. 2 (Prior Art) correspond to the NFs shown in FIG. 3 (Prior Art). The service(s) etc. that a NF provides to other authorized NFs can be exposed to the authorized NFs through the service-based interface. In FIG. 3 (Prior Art) the service-based interfaces are indicated by the letter "N" followed by the name of the NF, e.g. Namf for the service based interface of the AMF and Nsmf for the service based interface of the SMF etc. The Network Exposure Function (NEF) and the NRF in FIG. 3 (Prior Art) are not shown in FIG. 2 (Prior Art) discussed above. However, it should be clarified that all NFs depicted in FIG. 2 (Prior Art) can interact with the NEF and the NRF of FIG. 3 (Prior Art) as necessary, though not explicitly indicated in FIG. 2

PRIOR ART

Some properties of the NFs shown in FIGS. 2 and 3 may be described in the following manner. The AMF provides UE-based authentication, authorization, mobility management, etc. A UE even using multiple access technologies is basically connected to a single AMF because the AMF is independent of the access technologies. The SMF is responsible for session management and allocates IP addresses to UEs. It also selects and controls the UPF for data transfer. If a UE has multiple sessions, different SMFs may be allocated to each session to manage them individually and possibly provide different functionalities per session. The AF provides information on the packet flow to the PCF responsible for policy control in order to support QoS. Based on the information, the PCF determines policies about mobility and session management to make the AMF and SMF operate properly. The AUSF supports authentication function for UEs or similar and thus stores data for authentication of UEs or similar while the UDM stores subscription data of the UE. The NWDAF provides slice specific network data analytics to a NF. NWDAF notifies slice specific network status analytic information to the NFs that are subscribed to it. The Data Network (DN), not part of the 5G core network, provides Internet access or operator services and similar.

An NF may be implemented either as a network element on a dedicated hardware, as a software instance running on a dedicated hardware, or as a virtualized function instantiated on an appropriate platform, e.g., a cloud infrastructure.

Now, turning to some example embodiments of the present disclosure.

To start the following known use case for an SLA that has been agreed between a Mobile Network Operator, MNO and a customer is described and covers the following KPIs as example and not limited to:
  Number of users (group of users)
  Different fulfilment for different applications such as:
    80% of users running application 1 shall have a at least QoE_1 or higher (where QoE_1 might be an agreed MOS value)
    90% of users running application 2 shall have a at least QoE_2 or higher (where QoE_2 might be an agreed MOS value)
    Etc. . . .

Here it is assumed that a specific slice is going to be used for this customer. The KPIs above are made available for NWDAF.

In one aspect, two phases are described for accomplishing the SLA fulfillment: a Trial phase and a steady state phase which will be described in more details.

Trial Phase:
  Assume that the MNO from the above use case would like to assure that it can support the SLA by allocating a new slice. One way to do this is by a "trial" phase for the Slice. This trial period is used to assure that the new slice is not impacting existing services and slices in the network. Initial resources in the RAN and the CN are allocated to the slice. Agreement between the MNO and the customer during this trial phase is not known. But let's assume the customer can accept a non-signed SLA. The customer here may be another MNO, service provider, etc. a tenant that owns a plurality of subscribers.

One way to proceed is to start letting the customer populate the slice with users by introducing an initial number of users and add more and more UEs into the network operated by the MNO and let them start using the applications. Each user is allocated an initial QoS Flow, either per application if multiple QoS Flows are to be used or one general QoS Flow. The QoS profiles shall reflect the requirements of the services mapped on the QoS Flows as well as desired packet treatment at congestion.

Admission control of the UEs allows the network (operated by the MNO) to increase the maximum number of users belonging to the group (i.e., group of users assigned to the same slice). The OAM is aware of the number of users in the slice and allows users to be added to the slice as it deems necessary or feasible. The NSSF may receive the number of allowed users directly from the OAM or via the NWDAF.

The NWDAF monitors the QoE per user and/or for the whole group of users allocated to the slice for a customer. The NWDAF may also monitor other user's QoE with similar KPI from other customers and may also monitor the QoE for users that do not have an SLA with regards to the QoE. The NWDAF continuously calculates the percentage of the UEs in each customer's group of users to measure the fulfilment per application in the groups. The OAM subscribes to receiving the QoE information from the NWDAF.

The OAM uses the QoE info obtained from the NWDAF and other information needed for reaching the slice KPIs to optimize the resources in the RAN and/or in the 5GC.

Figure 6:
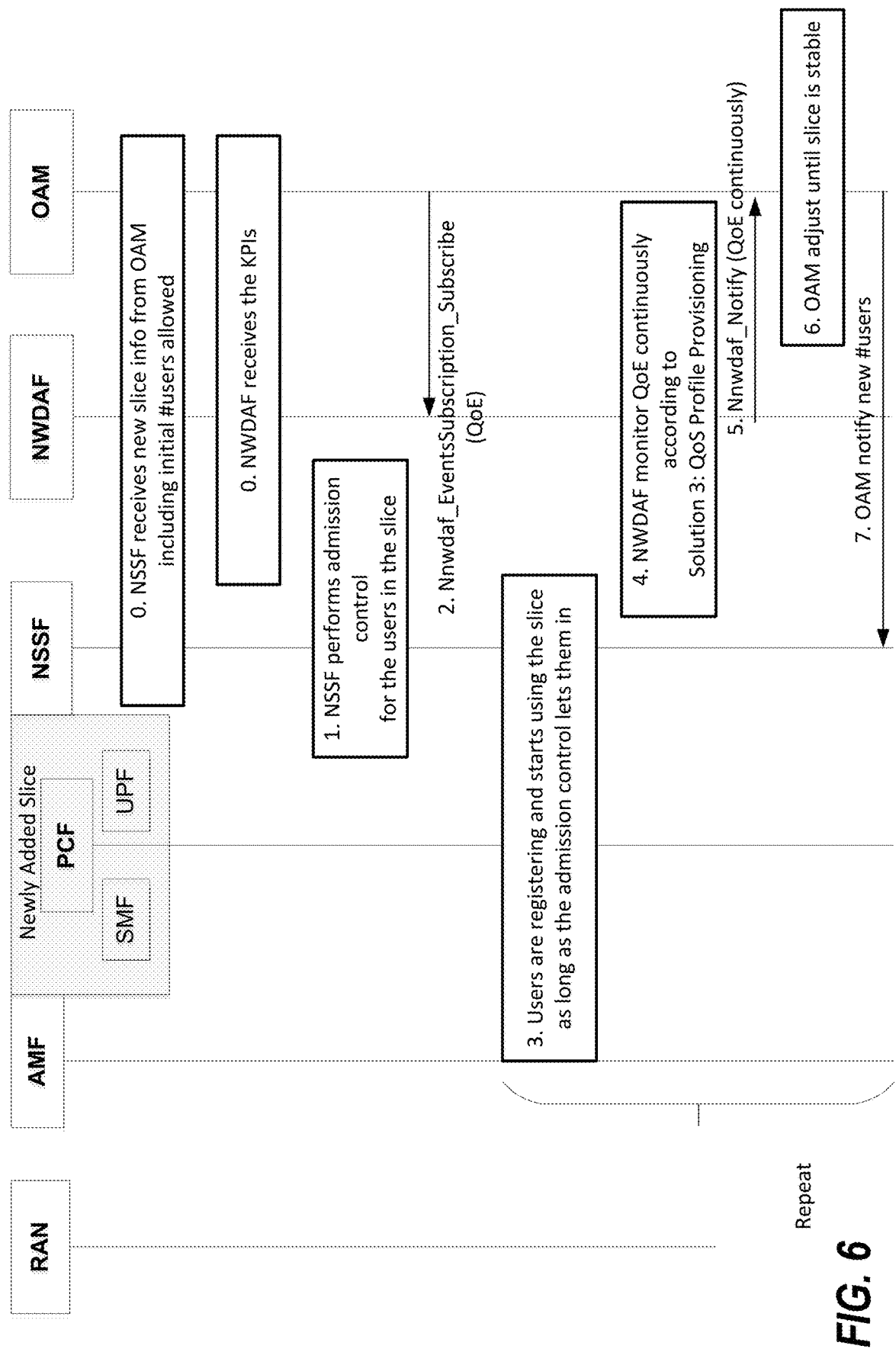
FIG. 6 illustrates a flow diagram of slice SLA fulfillment in accordance to some embodiments.

After a time period has elapsed and an acceptable number of users has been reached in a stable slice configuration, the trial phase ends. Setting the time period may depend on the KPI to be monitored or may be pre-configured. FIG. 6 illustrates a diagram of the Trial Phase in accordance with an embodiment. The steps of FIG. 6 are described as follows:

Step 0. Setup by the OAM of NSSF and NWDAF to start the trial phase. The number of users is forwarded from the OAM to the NSSF. The Number of users may be divided per Tracking Area (TA). The NWDAF receives from the OAM the KPI used for QoE monitoring.

Step 1. The NSSF performs admission control by determining whether to accept or not more users to a slice. This acceptance may be done per TA. At each registration, the AMF sends a slice request to the NSSF (this is done by either local configuration at the AMF, or UE requests a general slice (not available in the AMF) which forces the AMF to request the NSSF for the slice). If the NSSF admits the UE into the slice, the AMF allows the UE to use the slice when the UE established the PDU session with the slice. To ensure that the NSSF performs admission control based on number of active users allowed for the slice, the AMF may update the NSSF when a user allowed for the slice is deregistered. The AMF may also provide the number of users actually using the slice (S-NSSAI) in a PDU session. Alternatively, the number of allowed users may be updated by the OAM. To do so, the OAM may keep track of the actual number of active users for a slice (S-NSSAI). The active users may be one or more of:
  a. registered users allowed to use the S-NSSAI, i.e., S-NSSAI provided in the allowed S-NSSAIs in a registration accept,
  b. registered users using the S-NSSAI in a PDU session The OAM obtains the number of active users from the AMF via for example collected GAUGES such as for example GAUGES for the Mean number of registered subscribers as specified in 3GPP TS 28.552 clause 5.2.1.1. GAUGES are described in 3GPP TS 32.401 as one collection method and represent dynamic variables that may change in either direction. Gauges can be integer or real valued. If a gauge is required to produce low and high tide marks for a granularity period (e.g. minimum and maximum call duration), then it shall be reinitialised at the beginning of each granularity period. If a gauge is required to produce a consecutive readout over multiple granularity periods (e.g. cabinet temperature), then it shall only be reinitialised at the start of a recording interval. Any other collection method specified in 3GPP TS 32.401 can be used. Other collected information from AMF or SMF can be used to determine the number of users using used S-NSSAI. The OAM may then determine that the number of users allowed for the S-NSSAI previously sent to the NSSF at step 0 should be updated. The OAM determines the difference between previously sent number of allowed users to the NSSF for a slice and the de-registered number of users (or number of users using the S-NSSAI) and updates the NSSF accordingly. If the NSSF performs admission control per TA and if the GAUGES are provided by the AMF to the OAM are on per S-NSSAI, the NWDAF may need to keep track of number of active users per TA. If so NWDAF needs to subscribe to registering and de-registering events in the AMF. The NWDAF may then provide that information to the NSSF.

Step 2. The OAM subscribes with the NWDAF to receive QoE information per user or group of users belonging to or using specific slices with KPIs. The OAM optionally subscribes to receiving QoE information of other/all users in general slices such as MBB, IoT from the NWDAF.

Step 3. One or more UE register with an AMF. The AMF as part of successful registration provides the registered UE with allowed S-NSSAIs to use when establishing a PDU session. The AMF queries the NSSF with the NSSAI for a UE. When each of the registered UE establish a PDU session, the UE indicates the S-NSSAI for the PDU session that it wants to use.

Step 4. The NWDAF monitor QoE per UE or group of UEs using the S-NSSAI.

Step 5. The NWDAF notifies the OAM of the requested QoE measurement in response to the OAM subscribing to the QoE measurement notification for the UE or group of UEs. The UEs are identified by one of the IMSI, Subscriber Permanent Identifier, SUPI, or similar, etc. The NWDAF may provide one or more notification, each include QoE measurement collected at a given interval or time. Alternatively, NWDAF may send one notification that include one or more QoE measurements collected over a given interval of time that me be provided by the OAM in the subscription or that may be pre-configured at the NWDAF.

Step 6. In response to receiving a number (one or more) of QoE measurements for the users or group of users for the used S-NSSAI in one or more notification, the OAM determines that additional actions should be taken to reach the KPI to fulfill the SLA agreement for the UEs and triggers an action either in the RAN or the CN domain to reach the KPI for the slice. Such actions include but is not limited to reconfiguring resources allocated to the slice to fulfill the KPA. In addition reconfiguration of resources allocated to other slices may be triggered as well in which case resources are redistributed across the slices when necessary to fulfill the KPI for a slice while still maintaining the KPIs of the other slices. i.e., without compromising the SLA agreements associated to any other slices. Knowledge of QoE measurements of other slices may be taken into account when determining such actions related to resource reconfiguration or redistribution. This is done over time and after multiple iterations to assure the slice is stable.

Step 7. When the slice is stable, the OAM notifies a new number of allowed users for the slice.

Steady State Phase:

In this phase there may be some possible ways to do some dynamic changes for the users in a group to continuously fulfil the KPIs mentioned above. The OAM monitors the performance of the slice. To do so, it would involve the NWDAF to keep track of the QoE per user or group of users over a slice (S-NSSAI), i.e., users that are registered to the slice and/or users using the slice over a PDU session and ensures that the KPIs are maintained. Furthermore, the OAM may signal to the NSSF to not allow additional users to the slice.

Admission control by the NSSF may be done by controlling the number of users in a TA. The NSSF receives information from the OAM or perhaps the NWDA, hence enabling the NSSF to take decision on when users attempting to register from a specific TA may not be allowed to access the slice. These continuous actions are taken to provide necessary adjustments impacting the KPIs.

Note that the RAN continuously acts upon the fast dynamicity within the slice inside the RAN domain and ensures that the slice KPIs are not being underfitting. The RAN has knowledge of what UE belongs to a slice, which resources are used by the UE in the RAN in the slice and the relation to other UEs.

The steady state phase should not include change to any static configuration of resources for the slice in the RAN or in the CN. If static re-arrangement of resources is needed, then the slice should enter a non-steady phase similar to the trial phase while keeping the SLA and thereby required fulfilment of the KPIs.

Figure 7:
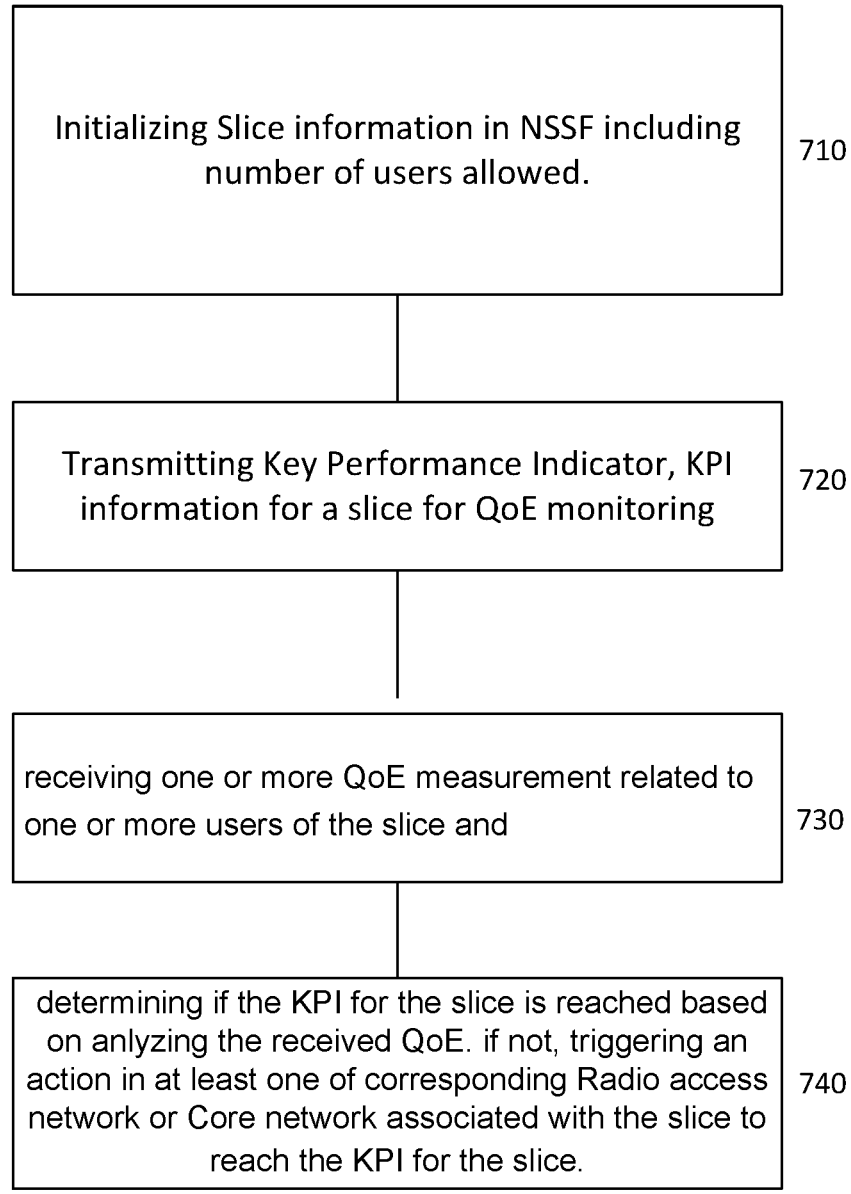
FIG. 7 illustrates a method of operation of a management node in accordance with an embodiment.

FIG. 7 illustrates an example method of operation in a management node performing a trial phase and a steady state phase. The method comprises step 710 of initializing slice information in the NSSF that includes providing an initial number of allowed users on a slice (S-NSSAI). The method describes step 720 of transmitting to a function in the network KPI information for a slice for QoE monitoring. The function in the network may be a NWDAF. Example of KPI is described in the use case above. The management node may subscribe at the function in the network (NWDAF) for receiving measured QoE information. The management node may indicate that the notifications be sent continuously or periodically or when a threshold is detected. At step 730, the management node receives notification (from NWDAF) comprising QoE information related to one or more users of the slice (again users of slice indicate registered users allowed to use the slice or users actually using the slice in a PDU session. In the former, the user is in registered mode, and in the latter the user is in connected mode). At step 740, the management node determines based on the received QoE information whether the KPI for the slice is reached and the SLA fulfilled, and if not, i.e., KPI not yet reached, the management node triggering an action, which may be taken after a certain amount of time, i.e., not necessarily immediately following the first notification of the QoE information. Alternatively, the action may be determined after receiving a configurable number of QoE reports, or at any time or instances deemed necessary in at least one of corresponding Radio access network or Core network associated with the slice to reach the KPI for the slice. The actions determined by the management node comprises resource reconfiguration by reducing or increasing the number of resources allocated to the slice in the radio access network and/or in the core network or both. After determining that the slice is stable, i.e., the KPI for the slice is reached and the SLA fullfilled, it then sends a notification to the NSSF to indicate that no new users can be allowed in the slice.

Figure 8:
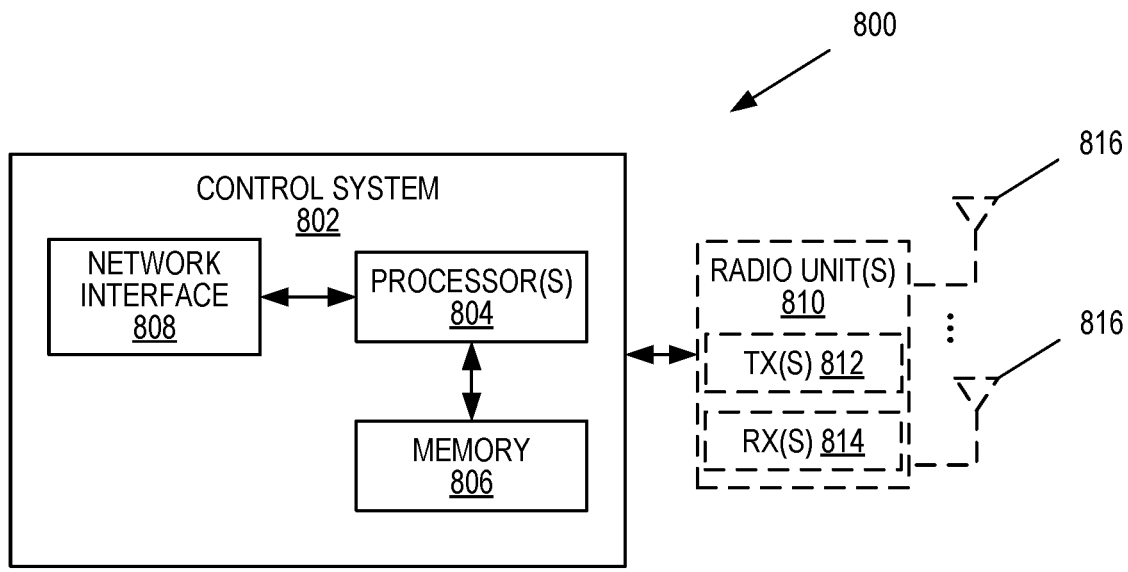
FIG. 8 illustrates a circuitry of a network node in accordance with an embodiment.

FIG. 8 is a schematic block diagram of a network node 800 according to some embodiments of the present disclosure. Optional components are represented here with dashed lines. The network node 800 may be, for example, radio access node (e.g., a base station 202 or 206 such as the gNB XX212) or a core network node (e.g., a node implementing a core network function such as, e.g., the NWDAF, the AMF, the NSSF or an OAM node. As illustrated, the network node 800 includes a control system 802 that includes one or more processors 804 (e.g., Central Processing Units (CPUs), Application Specific Integrated Circuits (ASICs), Field Programmable Gate Arrays (FPGAs), and/or the like), memory 806, and a network interface 808. The one or more processors 804 are also referred to herein as processing circuitry.

In addition, if the network node 800 is a radio access node, the network node 800 also includes one or more radio units 810 that each includes one or more transmitters 812 and one or more receivers 814 coupled to one or more antennas 816. The radio units 810 may be referred to or be part of radio interface circuitry. In some embodiments, the radio unit(s) 810 is external to the control system 802 and connected to the control system 802 via, e.g., a wired connection (e.g., an optical cable). However, in some other embodiments, the radio unit(s) 810 and potentially the antenna(s) 816 are integrated together with the control system 802. The one or more processors 804 operate to provide one or more functions of a network node 800 as described herein. In some embodiments, the function(s) are implemented in software that is stored, e.g., in the memory 806 and executed by the one or more processors 804.

Figure 10:
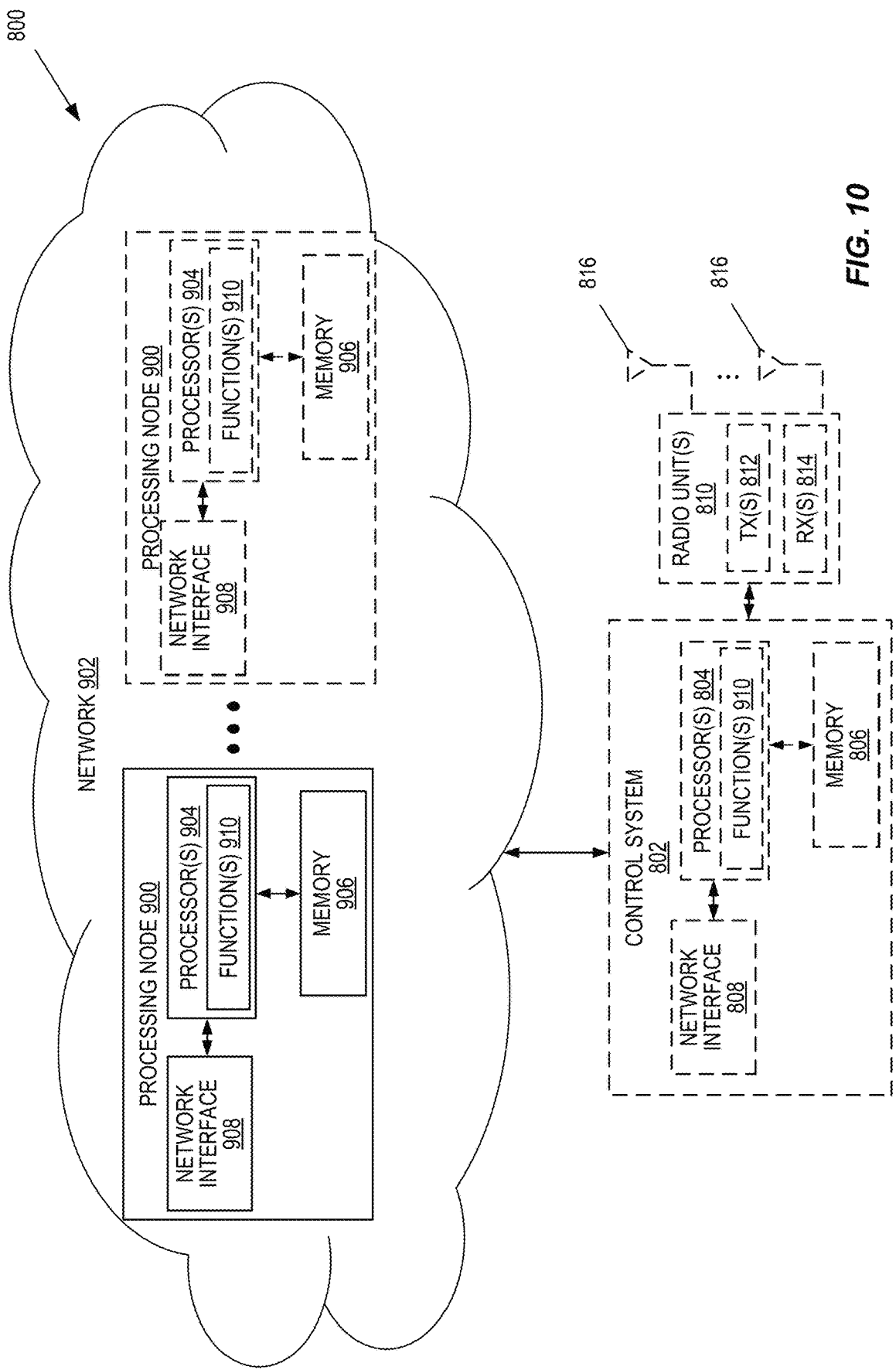
FIG. 10 illustrates a schematic block diagram of a virtualized network node in accordance with an embodiment.

FIG. 10 is a schematic block diagram that illustrates a virtualized embodiment of the network node 800 according to some embodiments of the present disclosure. Optional components are represented here with dashed lines. As used herein, a "virtualized" radio access node is an implementation of the network node 800 in which at least a portion of the functionality of the network node 800 is implemented as a virtual component(s) (e.g., via a virtual machine(s) executing on a physical processing node(s) in a network(s)). As illustrated, in this example, the network node 800 includes one or more processing nodes 900 coupled to or included as part of a network(s) 902 via the network interface 208. Each processing node 900 includes one or more processors 904 (e.g., CPUs, ASICs, FPGAs, and/or the like), memory 906, and a network interface 908. Optionally, the network node 800 includes the control system 802 of FIG. 8. If present, the control system 802 is connected to the one or more processing nodes 900.

In this example, functions 910 of the network node 800 described herein are implemented at the one or more processing nodes 900 or distributed across the control system 802 and the one or more processing nodes 900 in any desired manner. In some particular embodiments, some or all of the functions 910 of the network node 800 described herein are implemented as virtual components executed by one or more virtual machines implemented in a virtual environment(s) hosted by the processing node(s) 900. As will be appreciated by one of ordinary skill in the art, additional signaling or communication between the processing node(s) 900 and the control system 802 is used in order to carry out at least some of the desired functions 910. Notably, in some embodiments, the control system 802 may not be included, in which case the radio unit(s) 810 communicate directly with the processing node(s) 900 via an appropriate network interface(s).

In some embodiments, a computer program including instructions which, when executed by at least one processor, causes the at least one processor to carry out the functionality of network node 800 or a node (e.g., a processing node 900) implementing one or more of the functions 910 of the network node 800 in a virtual environment according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 9:
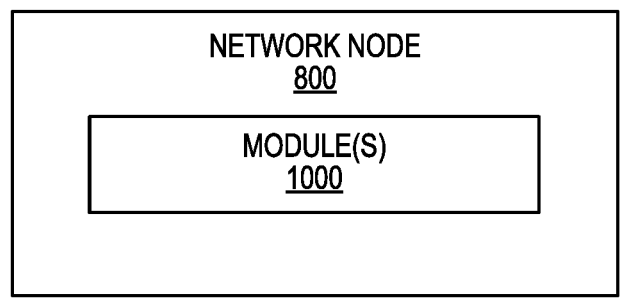
FIG. 9 illustrates a circuitry of a network node according to other embodiment.

FIG. 9 is a schematic block diagram of the network node 800 according to some other embodiments of the present disclosure. The network node 800 includes one or more modules 1000, each of which is implemented in software. The module(s) 1000 provide the functionality of the network node 800 described herein. This discussion is equally applicable to the processing node 900 of FIG. 10 where the modules 1000 may be implemented at one of the processing nodes 900 or distributed across multiple processing nodes 900 and/or distributed across the processing node(s)9 and the control system 802.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processor (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

While processes in the figures may show a particular order of operations performed by certain embodiments of the present disclosure, it should be understood that such order is exemplary (e.g., alternative embodiments may perform the operations in a different order, combine certain operations, overlap certain operations, etc.).

Embodiments

While not being limited thereto, some other example embodiments of the present disclosure are provided below.

Embodiments

1. A method of operation of a Management node for providing slice service level agreement guarantee, the method comprising:
  initializing slice information in NSSF including initial number of users allowed,
  transmitting KPI information for a slice for QoE monitoring;
  receiving notification for QoE related to one or more users of the slice; and
  determining if the KPI for the slice is reached, if not, triggering an action in at least one of corresponding Radio access network or Core network associated with the slice to reach the KPI for the slice.
2. The method of embodiment 1 wherein the triggering an action is performed after a period of time has elapsed.
3. The method of embodiment 1 wherein the triggering an action is performed after a receiving multiple notification for QoE related to one or more users of the slice.
4. The method of embodiment 1 wherein the method further comprises subscribing to notification for QoE monitoring for one or more users of the slice.
5. The method of embodiment 1 wherein triggering the action comprises reducing the number of resources allocated to the slice in the radio access network or in the core network or both.

6. The method of embodiment 1 wherein triggering the action comprises increasing the number of resources allocated to the slice in the radio access network or in the core network or both.

7. The method of embodiment 1 further comprising determining that the slice is stable and controlling the number of users accessing the slice.

8. The method of embodiment 7 wherein controlling the number of users comprises notifying the NSSF that new users are not to access the slice.

9. A computer program comprising instructions which, when executed on at least one processor, cause the at least one processor to carry out the method according to any one of embodiments 1 to 8.

10. A carrier containing the computer program of embodiment 9, wherein the carrier is one of an electronic signal, an optical signal, a radio signal, or a computer readable storage medium.

11. A management entity adapted to perform the method of any one of embodiments 1 to 8.

12. A management entity comprising:
   at least one receiver; and
   processing circuitry configured to cause the management entity to perform the method of any one of embodiments 1 to 8.

13. A management entity comprising one or more modules adapted to perform the method of any one of embodiments 1 to 8.

Abbreviations

At least some of the following abbreviations may be used in this disclosure. If there is an inconsistency between abbreviations, preference should be given to how it is used above. If listed multiple times below, the first listing should be preferred over any subsequent listing(s).

3GPP Third Generation Partnership Project
5G Fifth Generation
5GS Fifth Generation System
AF Application Function
AMF Access and Mobility Management Function
AN Access Network
ASIC Application Specific Integrated Circuit
AUSF Authentication Server Function
CNC Centralized Network Configuration
CPU Central Processing Unit
CUC Central User Configuration
DN Data Network
DSP Digital Signal Processor
eNB Enhanced or Evolved Node B
FPGA Field Programmable Gate Array
gNB New Radio Base Station
LTE Long Term Evolution
MTC Machine Type Communication
NAS Non-Access Stratum
NEF Network Exposure Function
NF Network Function
NR New Radio
NRF Network Repository Function
NSSF Network Slice Selection Function
NWDAF Network Data Analytic Function
OAM Operation and Management
PCF Policy Control Function
QoE Quality of Experience
RAN Radio Access Network
ROM Read Only Memory
TS Technical Specification
UDM Unified Data Management
UE User Equipment

The invention claimed is:

1. A method of providing network slice service level agreement guarantee, at a management node, the method comprising:
   initializing slice information at a network slice selection function (NSSF) entity including initial number of users allowed for a slice,
   transmitting to a network data analytics function (NWDAF) entity information related to Key Performance Indicators (KPI) for the slice for QoE monitoring and a subscription request to notification of QoE measurements;
   receiving one or more QoE measurements notifications from the NWDAF entity comprising one or more Quality of Experience (QoE) measurements related to one or more users of the slice;
   using the received one or more QoE measurements to determine whether the KPI for the slice is reached in accordance with a service level agreement;
   in response to determining that the KPI for the slice is not in accordance with the service level agreement, triggering an action in at least one of a corresponding Radio Access Network or a Core Network associated with the slice.

2. The method of claim 1 further comprising in response to determining that the KPI for the slice is in accordance with the service level agreement, monitoring a performance of the slice.

3. The method of claim 1 wherein the method further comprises subscribing at the NWDAF entity to notification for QoE measurements of the one or more users of the slice.

4. The method of claim 1 wherein triggering the action comprises reconfiguring resources allocated to the slice in at least one of the radio access network or in the core network.

5. The method of claim 4 wherein reconfiguring the resources comprises increasing the number of resources allocated to the slice in the Radio Access Network or in the Core Network.

6. The method of claim 4 wherein reconfiguring the resources comprises decreasing the number of resources allocated to the slice or another slice in the Radio Access Network or in the Core Network.

7. The method of claim 1 further comprising in response to determining that the KPI for the slice is in accordance with the service level agreement determining that the slice is stable and controlling the number of users accessing the slice.

8. The method of claim 7 wherein controlling the number of users comprises notifying the first network entity that new users are not allowed to access the slice.

9. The method of claim 8 wherein controlling the number of users comprises notifying the first network entity that new users are not allowed to access the slice from one or more specific tracking area.

10. A management entity comprising:
   at least one receiver; and
   processing circuitry configured to cause the management entity to:
      initialize slice information at a network slice selection function (NSSF) entity including initial number of users allowed for a slice,
      transmit to a network data analytics function (NWDAF) entity information related to Key Performance Indicators (KPI) for the slice for QoE monitoring and a subscription request to notification of QoE measurements;

receive one or more QoE measurements notifications from the NWDAF comprising entity one or more Quality of Experience (QoE) measurements related to one or more users of the slice;

use the received one or more QoE measurements to determine whether the KPI for the slice is reached in accordance with a service level agreement;

in response to determining that the KPI for the slice is not in accordance with the service level agreement, trigger an action in at least one of a corresponding Radio Access Network or a Core Network associated with the slice.

* * * * *